(12) United States Patent
Sago

(10) Patent No.: US 7,774,110 B2
(45) Date of Patent: Aug. 10, 2010

(54) FAILURE DIAGNOSIS APPARATUS FOR VEHICLE

(75) Inventor: Kenichi Sago, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 800 days.

(21) Appl. No.: 11/585,911

(22) Filed: Oct. 25, 2006

(65) Prior Publication Data

US 2007/0093948 A1    Apr. 26, 2007

(30) Foreign Application Priority Data

Oct. 25, 2005    (JP)    ............................ 2005-310345

(51) Int. Cl.
  *G01M 15/00*    (2006.01)
  *G06F 19/00*    (2006.01)
(52) U.S. Cl. ............................... 701/29; 701/1; 701/30; 701/31; 701/101; 701/102; 701/107; 701/113; 701/115; 73/114.01; 73/114.02; 73/114.08; 123/406.11; 123/406.13; 123/406.14; 123/406.19; 123/406.26; 123/406.27
(58) Field of Classification Search ................ 701/1, 701/29–31, 101, 102, 107, 113, 115; 73/114.01, 73/114.02, 114.08; 123/406.11, 406.13, 123/406.14, 406.19, 406.26, 406.27
  See application file for complete search history.

(56) References Cited

U.S. PATENT DOCUMENTS

| 5,184,594 | A | * | 2/1993 | Saitoh et al. ........... 123/406.13 |
| 5,357,790 | A | | 10/1994 | Hosoya |
| 5,594,646 | A | | 1/1997 | Itoh et al. |
| 6,135,085 | A | * | 10/2000 | Toyohara et al. ............. 123/306 |
| 6,285,931 | B1 | | 9/2001 | Hattori et al. |
| 6,415,210 | B2 | | 7/2002 | Hozuka et al. |
| 7,173,397 | B2 | | 2/2007 | Kinoshita et al. |
| 2001/0037168 | A1 | | 11/2001 | Hozuka et al. |
| 2006/0179928 | A1 | * | 8/2006 | Shikama et al. ............. 73/118.1 |

FOREIGN PATENT DOCUMENTS

JP    2002/097995    *    4/2002

OTHER PUBLICATIONS

Office Action mailed Oct. 1, 2009 issued in corresponding Japanese Application No. 2005-310345 with an at least partial English-language translation thereof.

* cited by examiner

*Primary Examiner*—Jack Keith
*Assistant Examiner*—Chuong P Nguyen
(74) *Attorney, Agent, or Firm*—Nixon & Vanderhye P.C.

(57) ABSTRACT

A failure diagnosis apparatus for a vehicle is disclosed. The apparatus includes a diagnosis processing section for executing failure diagnosis processing on a device of the vehicle to generate a diagnosis result. The apparatus also includes a data managing section for managing data of the diagnosis result. After an execution condition is met for failure diagnosis, the diagnosis processing section outputs an execution demand to the data managing section for the failure diagnosis processing. In response to the execution demand, the data managing section outputs an execution permission to the diagnosis processing section for the failure diagnosis processing. Also, after the execution condition is met for the failure diagnosis, the diagnosis processing section starts executing the failure diagnosis processing regardless of whether the execution permission has been outputted by the data managing section. A method of failure diagnosis is also disclosed.

8 Claims, 4 Drawing Sheets

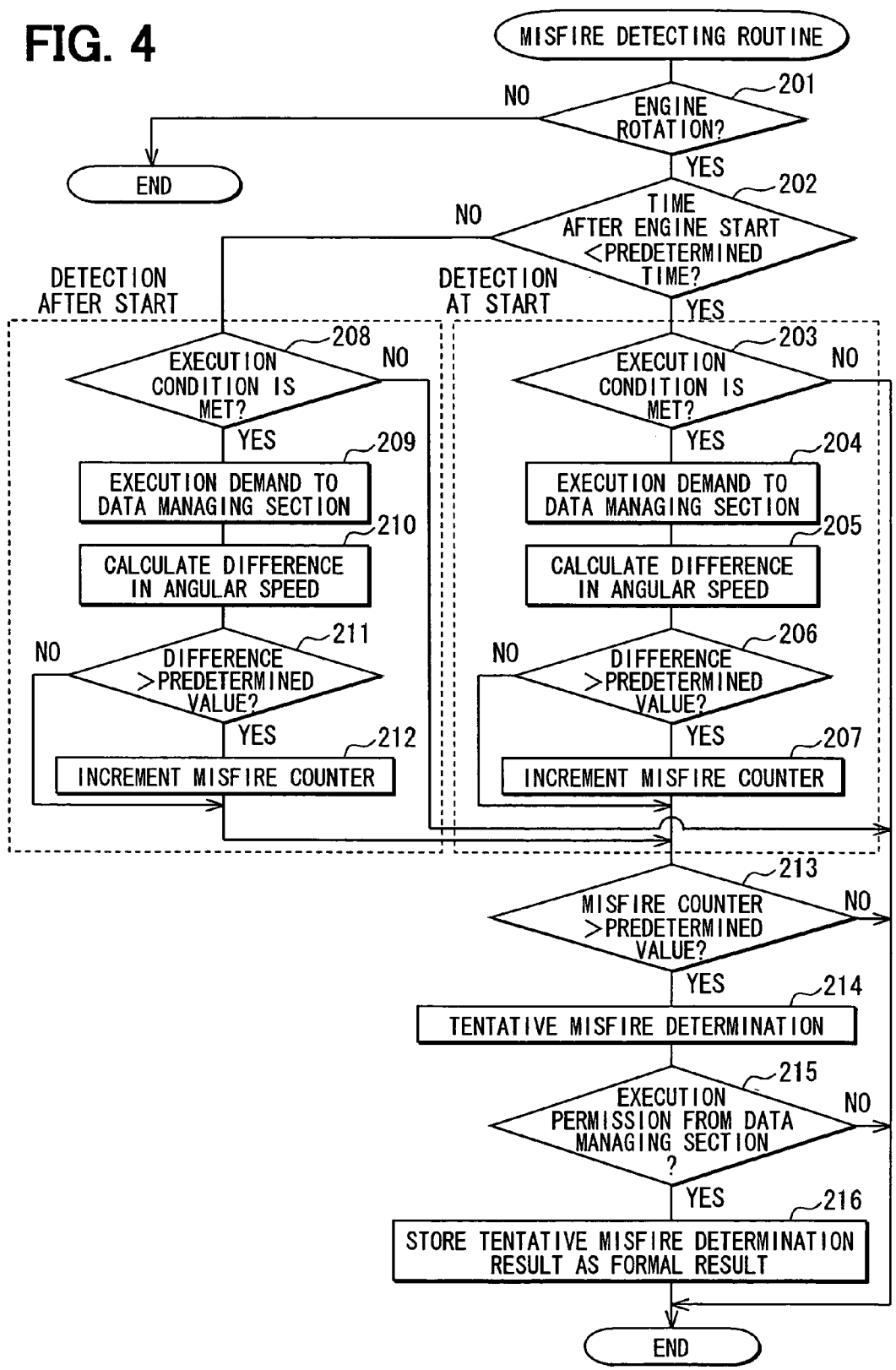

FAILURE DIAGNOSIS APPARATUS FOR VEHICLE

CROSS-REFERENCE TO RELATED APPLICATION

This application is based on Japanese Patent Application No. 2005-310345 filed on Oct. 25, 2005, the disclosure of which is incorporated herein by reference.

FIELD

The following relates to a failure diagnosis apparatus for a vehicle that executes failure diagnosis of a device of the vehicle.

BACKGROUND

It is known to provide a failure diagnosis system in a vehicle with advanced electronic control. The failure diagnosis system monitors whether or not a device of the vehicle is operating normally (i.e., whether a malfunction occurs). When the vehicle detects malfunction of the monitored device, the failure diagnosis system stores the malfunction data in memory such that control of the device reflects the malfunction content and/or such that the malfunction can be analyzed at a later time. For instance, U.S. Pat. No. 5,357,790 (Japanese Patent No. 2595819) discloses an internal combustion engine vehicle that has a system for diagnosing misfire (i.e., combustion failure) of the internal combustion engine.

Many vehicle failure diagnosis systems include a diagnosis processing section for executing failure diagnosis processes and an independent data managing section for managing the diagnosis result. When execution conditions are met for failure diagnosis, the diagnosis processing section outputs an execution demand for failure diagnosis to the data managing section, which in turn provides execution permission for the failure diagnosis, and then failure diagnosis commences. As such, early diagnosis of the failure may not occur.

For example, with the misfire detection system of U.S. Pat. No. 5,357,790, it can be difficult to detect misfiring at the time of engine starting. Misfiring detection is, however, permitted after fully starting the engine. In other words, misfiring detection is not performed at the time of engine starting, and a misfire may go undetected.

Furthermore, in a system where it is possible to execute the failure diagnosis process at cranking time of the internal combustion engine, failure diagnosis of a starter relay (i.e., power supply control system of a starter)), etc., the failure diagnosis processing is started after transmission of the execution permission. Therefore, failure diagnosis processing can be delayed undesirably, and the failure may not be detected.

Moreover, the diagnosis processing section and the data managing section are typically incorporated in a microcomputer of the engine control unit (ECU). Typically, the calculation cycle of the data managing section is a relatively slow cycle (e.g., 256 ms cycle) to avoid an excessively large calculation load of the ECU. As a result, output of the execution permission from the data managing section can be additionally delayed due to this relatively slow calculation cycle. Therefore, there may be significant delay between the time at which the execution condition is met and the start of failure diagnosis, and failure may go undetected.

SUMMARY

A failure diagnosis apparatus for a vehicle is disclosed. The apparatus includes a diagnosis processing section for executing failure diagnosis processing on a device of the vehicle to generate a diagnosis result. The apparatus also includes a data managing section for managing data of the diagnosis result. After an execution condition is met for failure diagnosis, the diagnosis processing section outputs an execution demand to the data managing section for the failure diagnosis processing. In response to the execution demand, the data managing section outputs execution permission to the diagnosis processing section for the failure diagnosis processing. Also, after the execution condition is met for the failure diagnosis, the diagnosis processing section starts executing the failure diagnosis processing regardless of whether the execution permission has been outputted by the data managing section. Thereafter, the data managing section outputs the execution permission for the failure diagnosis processing, and then the data of the diagnosis result of the failure diagnosis processing is output to and managed at the data managing section.

A method of detecting failure of a device of a vehicle is also disclosed. The method includes outputting an execution demand for failure diagnosis processing after an execution condition is met. The method also includes executing the failure diagnosis processing, wherein the failure diagnosis processing generates a diagnosis result relating to failure of the device. Furthermore, the method includes outputting the execution permission for the failure diagnosis processing after executing the failure diagnosis processing. Moreover, the method includes outputting and managing data of the diagnosis result after the outputting of the execution permission.

BRIEF DESCRIPTION OF THE DRAWINGS

Other objects, features, and advantages of the disclosure will become more apparent from the following detailed description made with reference to the accompanying drawings, in which like portions are designated by like reference numbers and in which:

FIG. 4 is a flow chart showing a misfire detecting routine.

DETAILED DESCRIPTION OF EXAMPLE EMBODIMENT

Figure 1:
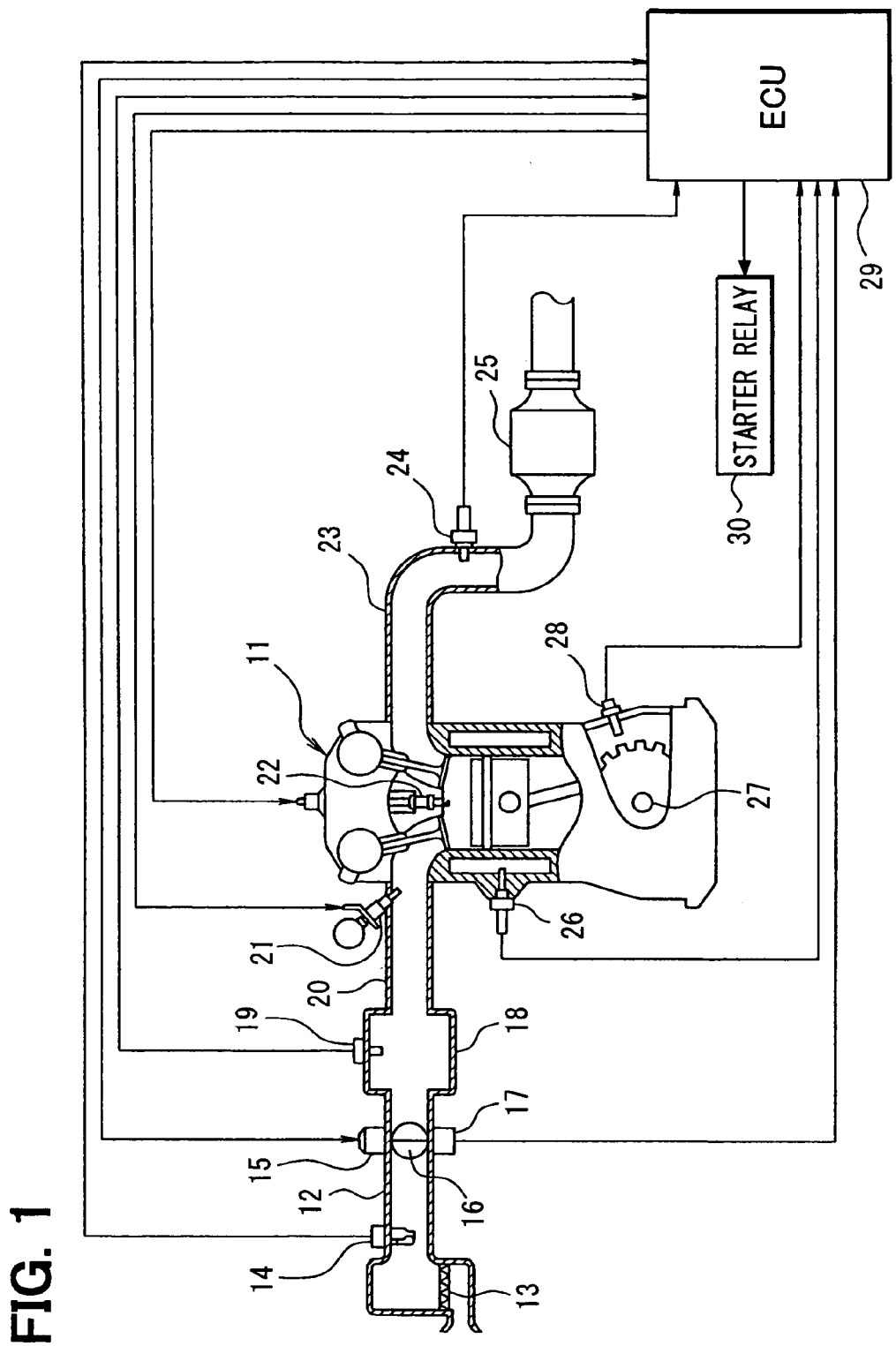
FIG. 1 is a schematic view of one embodiment of an engine control system.

First, referring to FIG. 1, an engine control system is schematically illustrated. An air cleaner 13 is located at the most upstream part of an intake pipe 12 for an engine 11 (e.g., an internal combustion engine). An air flow meter 14 for detecting an air intake quantity is located at the downstream side of the air cleaner 13. A throttle valve 16 an opening of which is adjusted by a motor 15 and a throttle opening sensor 17 for detecting an opening of the throttle valve 16 (i.e., throttle opening) are located at the downstream side of the air flow meter 14.

Further, a surge tank 18 is located at the downstream side of the throttle valve 16, and an intake pipe pressure sensor 19 for detecting an intake pipe pressure is located at the surge tank 18. An intake manifold 20 for introducing air into each cylinder of the engine 11 is located at the surge tank 18, and a fuel injection valve 21 is mounted adjacent an intake port of the intake manifold 20 in each cylinder for injecting fuel therein. An ignition plug 22 is mounted to the cylinder head of the engine 11 for each cylinder, and a fuel/air mixture in the cylinder is ignited by spark discharge of the respective ignition plug 22.

An exhaust gas sensor 24 (e.g., air-fuel ratio sensor for detecting air/fuel ratio, an oxygen sensor for detecting richness/leanness of exhaust gas, etc.) is located in the exhaust pipe 23 of the engine 11. A catalyst 25 such as a three-way catalyst for purifying the exhaust gas is located at the downstream side of the exhaust gas sensor 24.

A cooling water temperature sensor 26 for detecting a cooling water temperature and a crank angle sensor 28 for outputting a crank angle signal in synchronization with rotation of a crank shaft 27 of the engine 11 are mounted to the cylinder block of the engine 11. A crank angle or an engine rotational speed is detected based upon the crank angle signal.

Outputs of these various sensors are inputted to an engine control circuit 29 (hereinafter "ECU"). The ECU 29 is constituted mainly of a microcomputer and executes various engine control programs stored in memory (e.g., ROM) housed therein to control a fuel injection quantity of the fuel injection valve 21 and ignition timing of the ignition plug 22.

Figure 2:
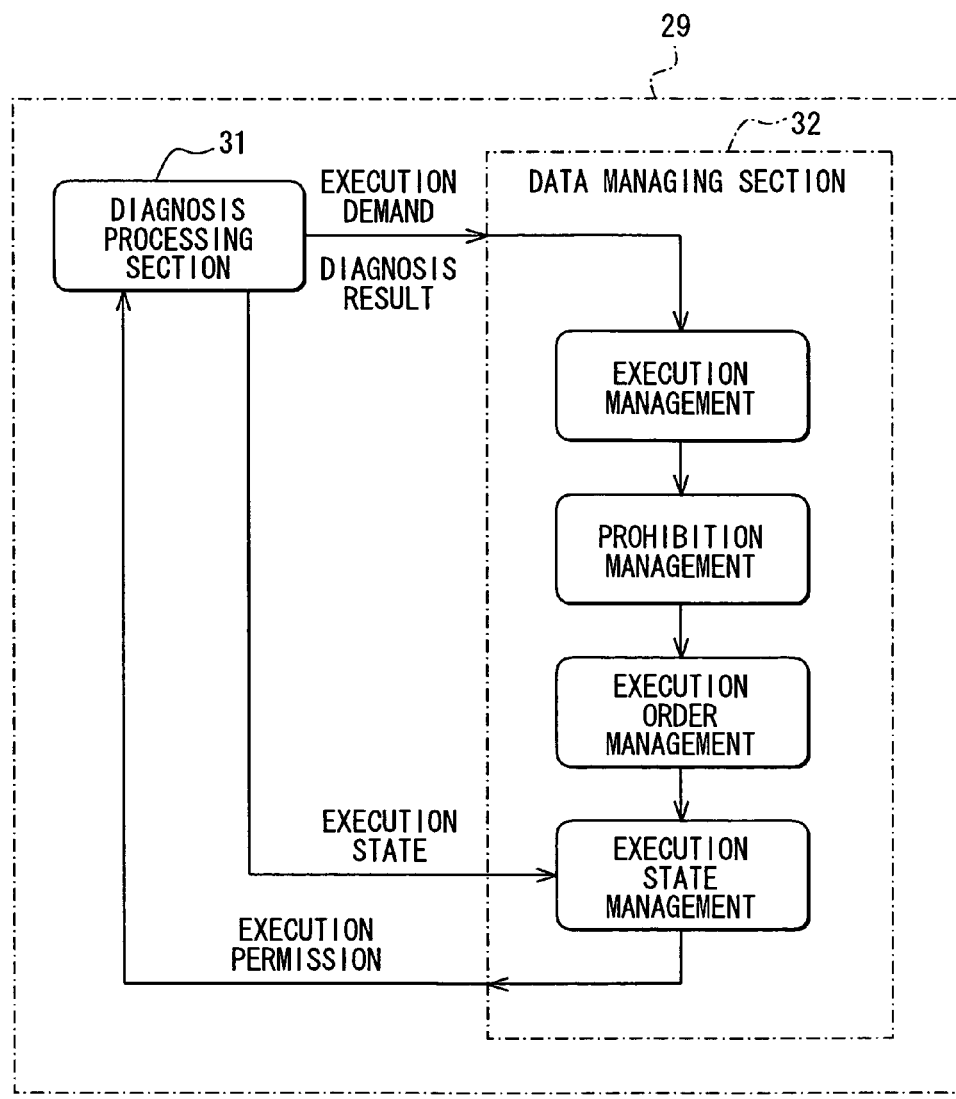
FIG. 2 is a schematic view of a diagnosis processing section and a data managing section of the engine control system of FIG. 1.

As shown in FIG. 2, the ECU 29 incorporates therein a diagnosis processing section 31, which executes failure diagnosis processing in the engine control system and auxiliary devices, and a data managing section 32, which manages diagnosis result data when the diagnosis processing section 31 executes failure diagnosis processing. The data of the diagnosis result is stored in rewritable involatile memory (e.g., backup RAM).

In prior art systems, the diagnosis processing section 31 outputs an execution demand for failure diagnosis processing to the data managing section 32 when a condition exists for failure diagnosis is met. Then, the diagnosis processing section 31 waits until the data managing section 32 outputs an execution permission command in response to the output of the execution demand. The diagnosis processing section 31 starts the failure diagnosis processing after the execution permission is outputted. A calculation cycle of the data managing section 32 is set at a relatively slow cycle (e.g., 256 ms) so that calculation load of the ECU 29 does not become excessively large. Therefore, even if the execution condition is met and the diagnosis processing section 31 demands the execution permission for the failure diagnosis processing to the data managing section 32, there may be a delay before the data managing section 32 actually outputs the execution permission command due to the relatively slow calculation cycle of the data managing section 32. This delay may cause inaccurate detection of a system failure.

For instance, in one embodiment, the system can detect misfiring at engine starting time (e.g., cranking time, power supply to starter, etc.) or failure of the starter relay 30 (i.e., the power supply control system for the starter). The delay command can cause inaccurate detection of failures in such systems.

In response to this problem, the present embodiment reduces this delay for more accurate failure detection. Specifically, when the execution condition is met, the diagnosis processing section 31 starts executing the failure diagnosis processing immediately after the ignition switch is turned on or after the engine is started (i.e., the cranking is started), regardless of whether the execution permission has been outputted by the data managing section 32. In other words, the failure diagnosis processing begins without an output of an execution permission command from the data managing section 32. Thereafter, the data managing section 32 outputs the execution permission for the failure diagnosis processing and then the data of the diagnosis result of the failure diagnosis processing is outputted to and managed by the data managing section 32.

In the embodiment shown in FIG. 4, the system is used for misfire detection as will be described in greater detail below. Immediately after the execution condition for the failure diagnosis is met, the diagnosis processing section 31 may output the execution demand for the failure diagnosis to the data managing section 32. However, in this embodiment, it is possible that the data managing section 32 outputs the execution permission for the failure diagnosis processing before completing the execution of the failure diagnosis processing when the execution time for the failure diagnosis processing is lengthened. In this way, when the data managing section 32 outputs the execution permission for the failure diagnosis processing before completing the execution of the failure diagnosis processing, the diagnosis result data may be outputted to the data managing section 32 after completing the execution of the failure diagnosis processing.

As an alternative, as a failure diagnosis routine for a starter relay in FIG. 3, which will be described in greater detail below, the execution demand for the failure diagnosis processing is outputted to the data managing section 32 after the diagnosis processing section 31 completes the execution of the failure diagnosis processing. In this way, even if the execution time for the failure diagnosis processing is lengthened, the failure diagnosis processing can be completed before the execution permission of the failure diagnosis processing is outputted. The diagnosis processing section 31 can output the data of the diagnosis result of the failure diagnosis processing to the data managing section 32 immediately when the data managing section 32 outputs the execution permission for the failure diagnosis processing.

Furthermore, as shown in FIG. 2, the data managing section 32 has the functions of execution management, prohibition management, execution order management, and management of an execution state of each diagnosis processing section 31 based upon information on an execution state from each diagnosis processing section 31.

Figure 3:
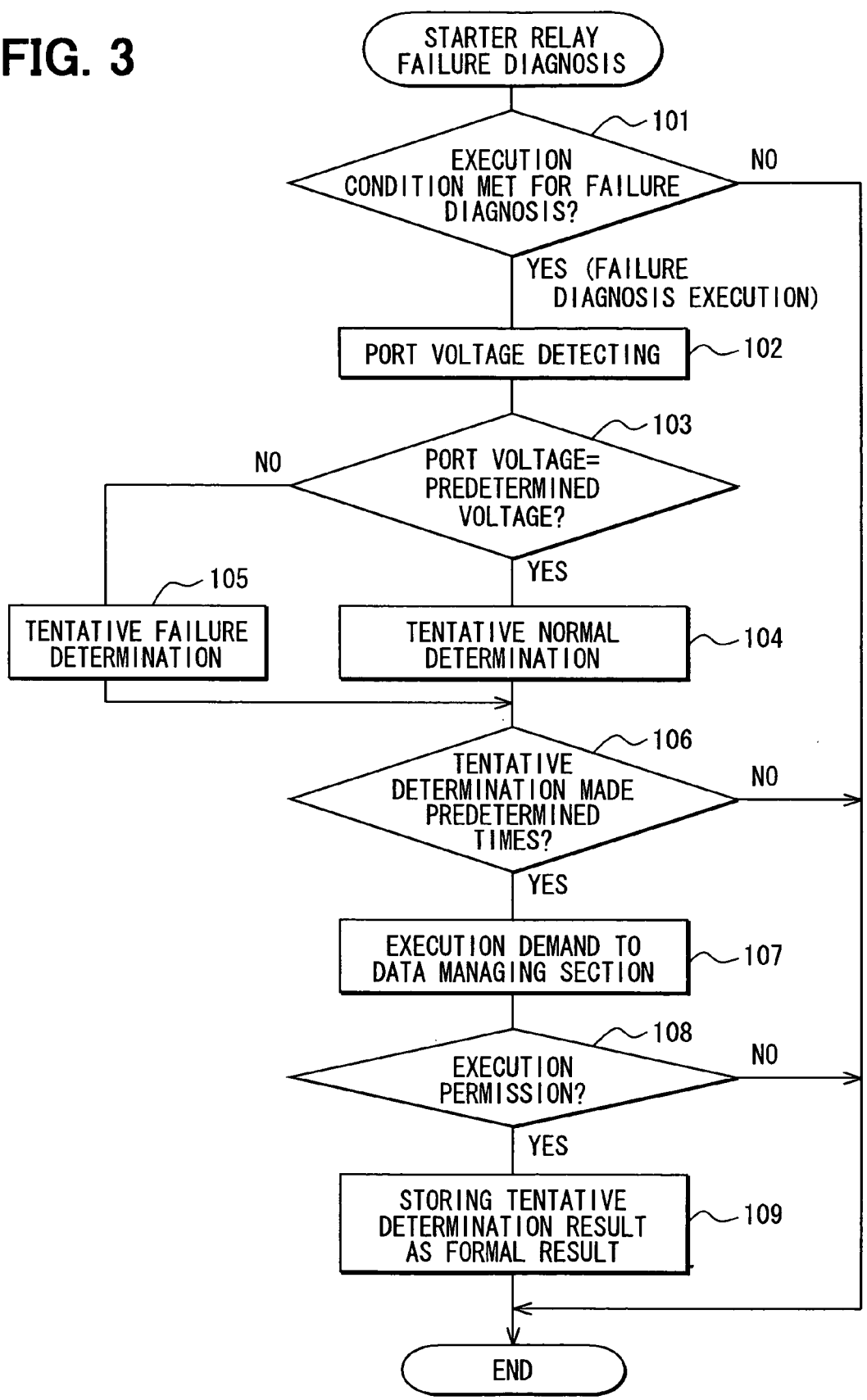
FIG. 3 is a flow chart showing a failure diagnosis routine for a starter relay.

In the embodiment shown, the ECU 29 executes a failure diagnosis routine for a starter relay in FIG. 3 and a misfire detecting routine in FIG. 4, thereby realizing functions of a plurality of diagnosis processing sections 31 (i.e., diagnosis processing section 31 for failure diagnosis of the starter relay and diagnosis processing section 31 for misfire detection). The processing content of each routine will be hereinafter described.

[Failure Diagnosis Routine for Starter Relay]

A failure diagnosis routine for the starter relay in FIG. 3 is executed at a predetermined cycle (e.g., 8 msec cycle) immediately after the ignition switch turns on or the engine is started (i.e., power is supplied to the starter). When the routine is activated, at step 101, it is determined whether the execution condition is met for the failure diagnosis of the starter relay 30. An affirmative determination is made in step 101 when the starter relay 30 is ON (i.e., drive command of the starter).

When the starter relay 30 is not ON, it is determined that the execution condition for the failure diagnosis of the starter relay 30 is not met. Then, the subsequent processing is not executed and the routine ends. On the other hand, when the starter relay 30 is ON, it is determined that the execution condition for the failure diagnosis of the starter relay 30 is met, and the process proceeds to step 102. In step 102, a port voltage for starter relay drive in the ECU 29 is detected.

Thereafter, the process proceeds to step 103, wherein it is determined whether the port voltage for starter relay drive is approximately equal to a predetermined voltage for activating the starter relay 30. When the port voltage is approximately equal to the predetermined voltage, the process proceeds to step 104, and a tentative normal determination is made. When the port voltage is not approximately equal to the predetermined voltage in step 103, the process proceeds to step 105, and a tentative failure determination is made.

Thereafter, the process proceeds to step 106, wherein it is determined whether the same result of step 103 is obtained sequentially a predetermined number of times. In other words, it is determined whether the tentative normal determination (step 104) or the tentative failure determination (step 105) is obtained sequentially a predetermined number of times. If a negative determination is made in step 106, the routine ends. On the other hand, if it is determined that the same tentative determination is obtained sequentially for the predetermined number of times, the process proceeds to step 107, wherein the execution demand for the failure diagnosis processing of the starter relay 30 is outputted to the data managing section 32.

Thereafter, the process goes to step 108, wherein it is determined whether the execution permission for the failure diagnosis of the starter relay 30 is outputted from the data managing section 32. If the execution permission is not outputted, the routine ends.

If execution permission is output from the data managing section 32, the process proceeds to step 109, wherein the tentative determination results from steps 104 and 105 are outputted as formal determination results to the data managing section 32 and stored in the rewritable involatile memory (e.g., backup RAM) thereof.

Thus, the failure diagnosis processing (the tentative determination) of the starter relay 30 is completed, and then, the execution demand for the failure diagnosis processing is outputted to the data managing section 32 (steps 106 and 107). It will be appreciated, however, that the execution demand for the failure diagnosis processing may be outputted to the data managing section 32 immediately when the execution condition is met for the failure diagnosis of the starter relay 30. In other words, the processing of step 107 may be executed following step 101.

[Misfire Detecting Routine]

A misfire detecting routine in FIG. 4 is executed at each predetermined crank angle (for example, each 30°) during ON time of the ignition switch. The routine begins in step 201, wherein it is determined whether the engine is rotating. If the engine is not rotating, the routine ends. However, if the engine is rotating, the process proceeds to step 202, wherein it is determined whether the time since the engine start is less than a predetermined amount of time. When the time since the engine start is less than the predetermined amount of time, it is determined that the misfire detection processing is to be executed during the engine starting time. Thereafter, the misfire detecting processing during the engine starting time at steps 203 to 207 (i.e., first misfire detecting process) is executed. When the time since the engine start is more than the predetermined amount of time, it is determined that misfire detection processing is to be executed after the engine is started. Thereafter, the misfire detecting processing during steps 208 to 212 (i.e., second misfire detecting process) is executed.

In another embodiment, step 202 determines whether the current number of ignitions is less than a predetermined ignition number in order to distinguish between engine starting time, wherein steps 203 to 207 follow, and an operation period after engine starting time, wherein steps 208 to 212 follow.

When an affirmative determination is made in step 202 (i.e., engine starting time is detected), the process proceeds to step 203, wherein it is determined whether the execution condition is met for misfire detection. In one embodiment, the execution condition is met when an engine rotational speed is more than a predetermined rotational speed at which the engine is self-rotatable. In another embodiment, the execution condition is met when the ignition control system normally operates. In still another embodiment, the execution condition is met during normal operation of the crank angle speed detecting system for detecting an engine rotational fluctuation. It will be appreciated, however, that the execution condition could be met in any suitable manner.

If the execution condition is not met in step 203, the routine ends without executing the subsequent processing. On the other hand, if the execution condition is met in step 203, step 204 follows, and the execution demand for the misfire detecting processing is outputted to the data managing section 32.

Then, the process proceeds to step 205 to calculate a difference in crank angular speed for misfire detection at the engine starting time (engine rotational information). Next, in step 206, the difference in crank angular speed for the misfire detection at the engine starting time is compared with a predetermined value. When the difference in crank angular speed for the misfire detection at the engine starting time is greater than a predetermined value, it is determined that the misfire occurs. The process proceeds to step 207, wherein a misfire counter for counting the number of misfires is incremented. When the difference in crank angular speed for the misfire detection at the engine starting time is less than a predetermined value in step 206, it is determined that the misfire does not occur, and step 207 is skipped (i.e., the misfire counter is not incremented). Then, step 213 follows as will be described in greater detail below.

When it is determined in step 202 that the engine has been started, the process proceeds to step 208, wherein it is determined whether the execution condition is met for misfire detection after the engine has been started. In one embodiment, the execution condition is met when the engine is not in the fuel cut duration. In another embodiment, the execution condition is met when the ignition control system normally operates. In still another embodiment, the execution condition is met when a crank angle speed detecting system for detecting an engine rotational fluctuation normally operates. It will be appreciated, however, that detection of the execution condition can occur in any suitable manner.

When it is determined at step 208 that the execution condition is not met, the routine ends without executing the subsequent processing. On the other hand, when it is determined that the execution condition has been met, the process proceeds to step 209, wherein the execution demand for the misfire detecting processing is outputted to the data managing section 32. Then, the process proceeds to step 210 to thereby calculate a difference in crank angular speed (engine rotational information) for the misfire detection after the engine is started.

Next, in step 211, the difference in crank angular speed is compared with a predetermined value. When the difference in crank angular speed is greater than a predetermined value, it is determined that a misfire occurs, and the process proceeds to step 212. In step 212, a misfire counter for counting the number of misfires is incremented. However, when the difference in crank angular speed is less than a predetermined value in step 211, it is determined that the misfire does not occur, the misfire counter is not incremented (i.e., step 212 is skipped) and step 213 follows as will be described.

After the misfire detecting processing in either steps 203-207 (during engine starting time) or steps 208-212 (after engine starting time), the process proceeds to step 213. In step 213, it is determined whether a misfire count value (i.e., the number of misfires) of the misfire counter exceeds a predetermined value. When a count value of the misfire counter is less than a predetermined value, the routine ends. However, when a count value of the misfire counter exceeds a predetermined value, the process proceeds to step 214, wherein the tentative misfire determination is made and stored in memory (e.g., RAM) of the ECU 29. It will be appreciated that the processing at steps 213 and 214 corresponds to tentative misfire determination processing.

Thereafter, the process proceeds to step 215, wherein it is determined whether the execution permission for the misfire detecting processing is outputted from the data managing section 32. If the execution permission is not outputted, the routine ends. However, if the execution permission for the misfire detecting processing is outputted from the data managing section 32, the process proceeds to step 216. In step 216, the tentative misfire determination result obtained from the misfire detecting processing in step 214 is outputted to the data managing section 32 as a formal misfire determination and is stored in the rewritable involatile memory (e.g., backup RAM).

It will be appreciated that although misfire is detected based upon the engine rotational fluctuation information (i.e., a difference in a crank angular speed), the misfire can be detected in another suitable fashion. For instance, misfiring can be detected using an ion current, a combustion pressure (i.e., in-cylinder pressure), or any other suitable means.

According to the embodiment as described above, when the execution condition is met for failure diagnosis, the failure diagnosis processing starts regardless of the output of the execution permission from the data managing section 32. Therefore, as compared to conventional failure diagnosis systems, the failure diagnosis processing of the embodiment discussed above starts earlier for more accurate failure detection. Also, when the execution permission for the failure diagnosis processing is outputted, the data of the diagnosis result in the failure diagnosis processing can be quickly outputted to the data managing section 32. As a result, the data managing section 32 can manage the data of the diagnosis result earlier.

With respect to the failure diagnosis processing of the starter relay 30 and the misfire detecting processing, the failure diagnosis processing starts without an output of the execution permission for the failure diagnosis processing from the data managing section 32. Therefore, failure of the starter relay 30, which can be detected only at cranking time (i.e., when power is supplied to the starter), can be detected and also misfiring at engine starting time, which is unlikely to be detected with conventional systems, can be detected.

It will be appreciated that the present disclosure is not limited to the failure diagnosis processing of the starter relay 30 and the misfire detecting processing, but can be applied to any suitable device of a vehicle.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A failure diagnosis apparatus for a vehicle comprising:
   a diagnosis processing section configured to execute failure diagnosis processing on a device of the vehicle to generate a diagnosis result; and
   a data managing section configured to manage data of the diagnosis result wherein after an execution condition is met for failure diagnosis, the diagnosis processing section outputs an execution demand to the data managing section for the failure diagnosis processing and, in response to the execution demand, the data managing section outputs an execution permission to the diagnosis processing section for the failure diagnosis processing, wherein
   the diagnosis processing section is configured to determine whether the data managing section outputs the execution permission to the diagnosis processing section for the failure diagnosis processing;
   the diagnosis processing section is configured to start, after the execution condition is met for the failure diagnosis, executing the failure diagnosis processing regardless of whether the execution permission has been outputted by the data managing section; and
   when the diagnosis processing section determines that the data managing section outputs the execution permission for the failure diagnosis processing, the data of the diagnosis result of the failure diagnosis processing is output to and managed at the data managing section.

2. A failure diagnosis apparatus for a vehicle according to claim 1, wherein:
   the diagnosis processing section is configured to complete execution of the failure diagnosis processing and then output the execution demand for the failure diagnosis processing to the data managing section.

3. A failure diagnosis apparatus for a vehicle according to claim 1, wherein:
   the diagnosis processing section is configured to execute misfire detecting processing of an engine as the failure diagnosis processing.

4. A failure diagnosis apparatus for a vehicle according to claim 1, wherein:
   the diagnosis processing section is configured to execute failure diagnosis processing in a power supply control system for a starter as the failure diagnosis processing.

5. A failure diagnosis apparatus for a vehicle according to claim 1, wherein:
   the diagnosis processing section is configured to start executing failure diagnosis processing immediately after an ignition switch turns on.

6. A failure diagnosis apparatus for a vehicle according to claim 1, wherein:
   the diagnosis processing section is configured to start executing failure diagnosis processing immediately after an internal combustion engine of the vehicle is started.

7. A failure diagnosis apparatus for a vehicle according to claim 3, wherein:
   the diagnosis processing section includes:
   a first misfire detecting device that is configured to execute misfire detecting processing immediately after an engine of the vehicle is started;
   a second misfire detecting device that is configured to execute the misfire detecting processing when a time since a start of the engine is more than a predetermined amount of time; and a tentative misfire detecting device which is configured to make a tentative misfire determination based upon a plurality of misfire detecting processing results of the first and second misfire detecting devices regardless of whether the execution permission has been output from the data managing section, wherein:

when the data managing section is configured to output the execution permission for the misfire detecting processing, the tentative misfire determination result becomes a formal misfire determination result and outputs the formal misfire determination result to the data managing section.

8. A failure diagnosis apparatus for a vehicle according to claim 3, wherein:

the diagnosis processing section includes:

a first misfire detecting device that is configured to execute misfire detecting processing immediately after an engine of the vehicle is started;

a second misfire detecting device that is configured to execute the misfire detecting processing when ignition occurs a predetermined number of times after the engine is started; and a tentative misfire detecting device which is configured to make a tentative misfire determination based upon a plurality of misfire detecting processing results of the first and second misfire detecting devices regardless of whether the execution permission has been output from the data managing section, wherein:

when the data managing section is configured to output the execution permission for the misfire detecting processing, the tentative misfire determination result becomes a formal misfire determination result and output the formal misfire determination result to the data managing section.

* * * * *